United States Patent
Huang et al.

(10) Patent No.: US 7,961,436 B1
(45) Date of Patent: *Jun. 14, 2011

(54) DISK DRIVE HEAD STACK ASSEMBLY WITH CLIP FOR MOUNTING A FLEX CABLE

(75) Inventors: Lidu Huang, Danville, CA (US); Seungman Chang, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,233

(22) Filed: Apr. 16, 2010

Related U.S. Application Data

(63) Continuation of application No. 11/294,732, filed on Dec. 6, 2005, now Pat. No. 7,729,091.

(51) Int. Cl.
*G11B 5/55* (2006.01)
*G11B 21/08* (2006.01)

(52) U.S. Cl. ...... 360/264.2; 248/63; 248/74.2; 174/72 A

(58) Field of Classification Search .............. 248/62, 248/63, 65, 68.1, 74.1, 74.2, 229.16, 316.7; 360/264.2, 245.8, 245.9, 246; 174/135, 72 A, 174/40 CC
See application file for complete search history.

(56) References Cited

U.S. PATENT DOCUMENTS

| | | | |
|---|---|---|---|
| 4,933,785 A | 6/1990 | Morehouse et al. | |
| 5,103,359 A | 4/1992 | Marazzo | |
| 5,109,310 A | 4/1992 | Ohkjita et al. | |
| 5,130,874 A * | 7/1992 | Watrous | 360/266.3 |
| 5,130,895 A | 7/1992 | Somemiya et al. | |
| 5,161,074 A | 11/1992 | Forbord et al. | |
| 5,185,683 A | 2/1993 | Oberg et al. | |
| 5,270,887 A | 12/1993 | Edwards et al. | |
| 5,375,021 A | 12/1994 | Boeckner | |
| 5,818,667 A | 10/1998 | Larson | |
| 5,907,452 A | 5/1999 | Kan | |
| 5,953,183 A | 9/1999 | Butler et al. | |
| 6,168,459 B1 | 1/2001 | Cox et al. | |
| 6,480,362 B1 * | 11/2002 | Yoshida et al. | 360/264.2 |
| 6,724,578 B2 | 4/2004 | Watanabe | |
| 6,937,442 B2 | 8/2005 | Zhao et al. | |
| 6,970,329 B1 | 11/2005 | Oveyssi et al. | |
| 7,054,110 B2 | 5/2006 | Nakamura et al. | |
| 7,729,091 B1 * | 6/2010 | Huang et al. | 360/264.2 |
| 2003/0137776 A1 | 7/2003 | Zhoa et al. | |

(Continued)

OTHER PUBLICATIONS

Office Action dated Jun. 16, 2008 from U.S. Appl. No. 11/294,732, 6 pages.

(Continued)

*Primary Examiner* — Craig A. Renner
*Assistant Examiner* — Adam B Dravininkas

(57) ABSTRACT

A disk drive has a novel head stack assembly that includes a flex cable having a width, an actuator body, and a clip. A top portion of the clip includes a first top slot and a second top slot, forming a non-zero acute angle. The bottom portion of the clip includes a first bottom slot that is substantially aligned to face and oppose the first top slot, and a second bottom slot that is substantially aligned to face and oppose the second top slot. A first maximum distance between the first top slot and the first bottom slot equals or exceeds the width. A second maximum distance between the second top slot and the second bottom slot equals or exceeds the width. The slots retain the flex cable. The top portion and the bottom portion are a single monolithic piece.

18 Claims, 5 Drawing Sheets

U.S. PATENT DOCUMENTS

2003/0147180 A1 8/2003 Rosner et al.
2003/0214758 A1 11/2003 Lim et al.
2005/0190489 A1 9/2005 Izumi et al.

OTHER PUBLICATIONS

Office Action dated Sep. 18, 2008 from U.S. Appl. No. 11/294,732, 17 pages.
Office Action dated Mar. 16, 2009 from U.S. Appl. No. 11/294,732, 15 pages.
Office Action dated Jun. 2, 2009 from U.S. Appl. No. 11/294,732, 3 pages.
Office Action dated Jul. 20, 2009 from U.S. Appl. No. 11/294,732, 16 pages.
Office Action dated Nov. 12, 2009 from U.S. Appl. No. 11/294,732, 15 pages.
Office Action dated Jan. 29, 2010 from U.S. Appl. No. 11/294,732, 4 pages.

* cited by examiner

DISK DRIVE HEAD STACK ASSEMBLY WITH CLIP FOR MOUNTING A FLEX CABLE

CROSS-REFERENCE TO RELATED APPLICATION

This application is a continuation of pending U.S. patent application Ser. No. 11/294,732, filed Dec. 6, 2005, which is incorporated herein by reference in its entirety.

FIELD OF THE INVENTION

The present invention relates to information storage technology, and more particularly to head stack assemblies in disk drives.

BACKGROUND

FIG. 1 depicts a conventional head stack assembly (HSA) 10. The conventional HSA 10 includes an actuator assembly 12 including an actuator body 14 and an actuator arm 16, a head gimbal assembly (HGA) 18 including head(s) 20, a flex cable 22, circuitry 24, metal stiffener 26, and a conventional mechanism 30 for coupling the flex cable 22 with the actuator body 14. The conventional HSA 10 is part of a disk drive including disk(s) (not shown) and at least one base (not shown) to which the disk(s) and conventional HSA 10 are coupled. The actuator assembly 12 moves, for example rotating toward or away from the disk, in response to a servo control system (not shown). The head(s) 20 extend from the HGA 18 in proximity to disk(s) and are used in writing to or reading from the disk(s).

The conventional mechanism 30 used to mount the flex cable 22 to the actuator body 14 may be a clip 30. Typically, the flex cable 22 fits within slots in the clip 30. The clip 30 holding the flex cable 22 clips onto a mounting surface, such as a metal stiffener 26. The metal stiffener 26 is thus used to mount the conventional mechanism clip 30 and the flex cable 22 to the actuator body 14. The flex cable 22 electrically couples the head (s) 20 to the circuitry 24. The flex cable 22 can be considered to include a first portion 22A and a second portion 22B separated by a bend.

Although the conventional HSA 10 functions, the use of the flex cable 22 has drawbacks. FIG. 2 depicts a close-up of the conventional HSA 10 near the clip 30. The clip 30 holds the flex cable 22, such that portions 22A and 22B of the flex cable 22 form an angle, θ, of less than or equal to zero degrees. The angle θ is less than zero degrees in FIG. 1, but might be zero if the portion 22B is parallel to the portion 22A. Consequently, the exit angle, α, for the flex cable 22 is relatively large. As a result, there is a possibility that the flex cable 22 will interfere with the remainder of the conventional HSA 10. For example, when the head(s) 20 are at the outside diameter of the disk(s), the flex cable 22 may interfere with the conventional actuator assembly 12. Similarly, the flex cable 22 may interfere with the disk(s) when the head(s) 20 are at inside diameter of the disk(s). Interference with the flex cable 22 and the disk(s) or the actuator assembly 12 adversely affects performance of the disk drive. Furthermore, because of the size of the exit angle, α, a larger driving torque from the servo control system is required to position the head(s) 20 at the inside diameter of the disk(s). A voice coil motor (not shown) within the servo control system provides the torque used in rotating the actuator assembly 12. The roll-off of the voice coil motor of the servo control system is typically significant near the inside diameter of the disk(s). Consequently, the conventional HSA 10 may be more difficult to position near the inside diameter of the disk(s).

Accordingly, what is needed is an improved system and method for mounting the flex cable in the head stack assembly.

SUMMARY

A disk drive has a novel head stack assembly that includes a flex cable having a width, an actuator body, and a clip for mounting the flex cable to the actuator body. The clip includes a top portion and a bottom portion coupled to the top portion. The top portion includes a first top slot and a second top slot. The first top slot and the second top slot form a non-zero acute angle. The bottom portion includes a first bottom slot and a second bottom slot. The first bottom slot is substantially aligned with the first top slot to face and oppose the first top slot. The second bottom slot is substantially aligned with the second top slot to face and oppose the second top slot. A first maximum distance between the first top slot and the first bottom slot equals or exceeds the width. A second maximum distance between the second top slot and the second bottom slot equals or exceeds the width. The first and second top slots and the first and second bottom slots retain the flex cable. The top portion and the bottom portion are a single monolithic piece rather than an assembly of sub-components.

DETAILED DESCRIPTION OF EXAMPLE EMBODIMENTS

Figure 1:
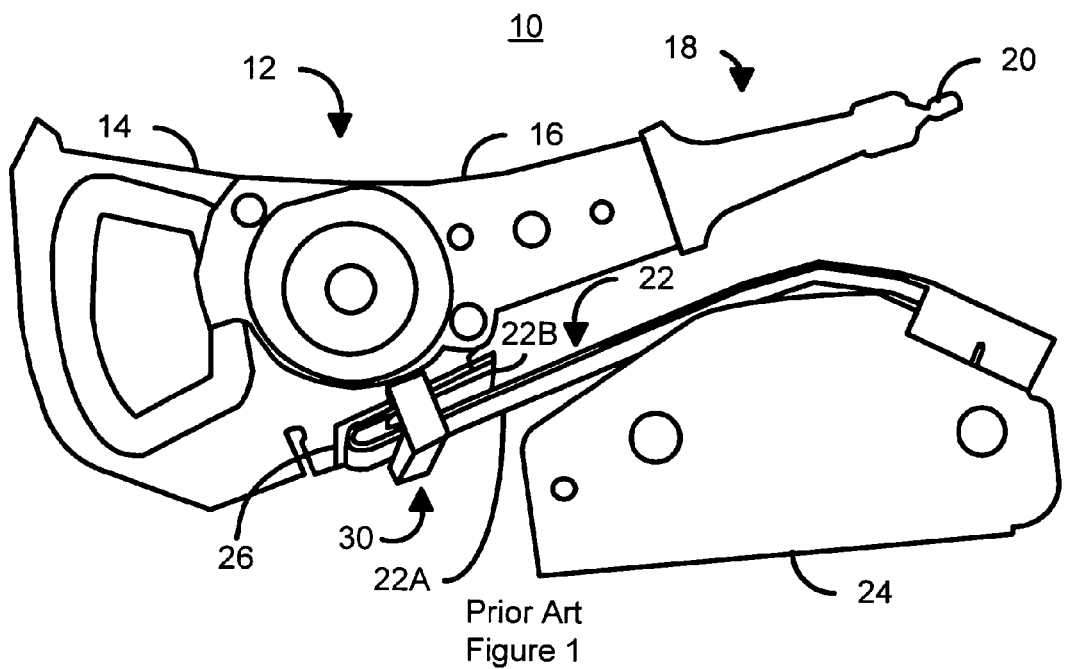
FIG. 1 is a diagram depicting a conventional head stack assembly of a conventional disk drive.
Figure 2:
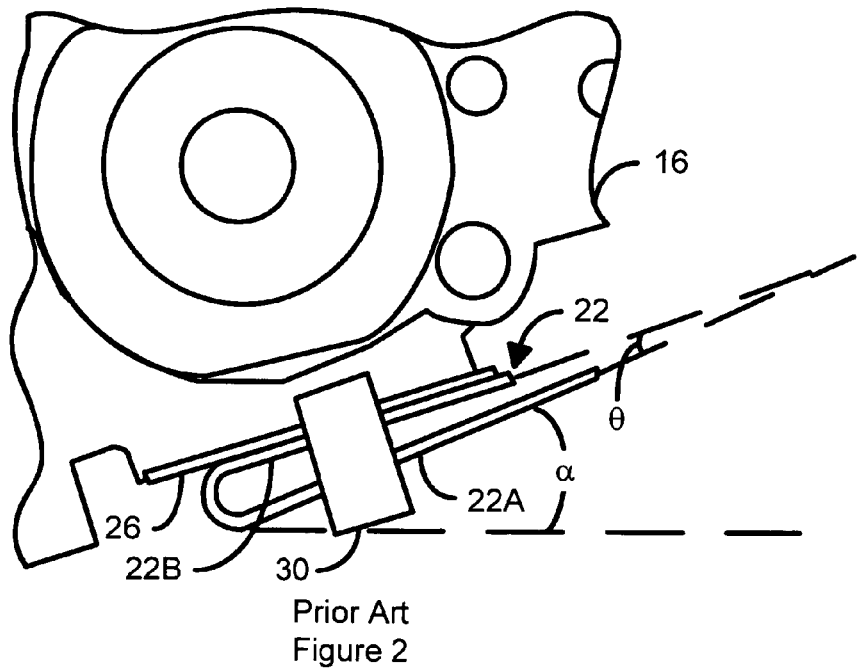
FIG. 2 is a diagram depicting a conventional head stack assembly of a conventional disk drive.
Figure 3:
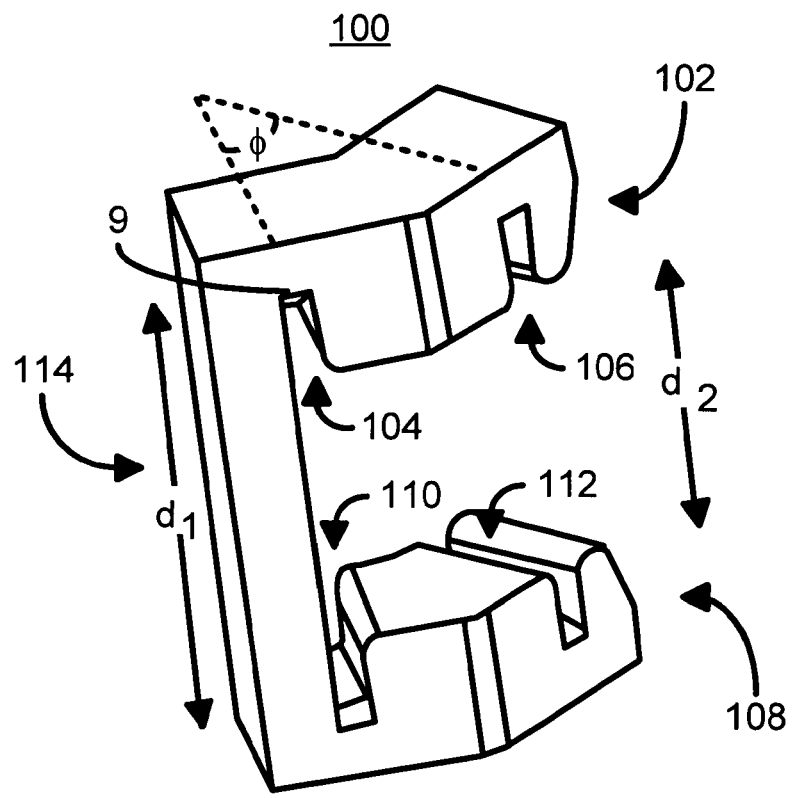
FIG. 3 depicts a clip formed in accordance with an exemplary embodiment of the present invention for mounting a flex cable in a head stack assembly.
Figure 4:
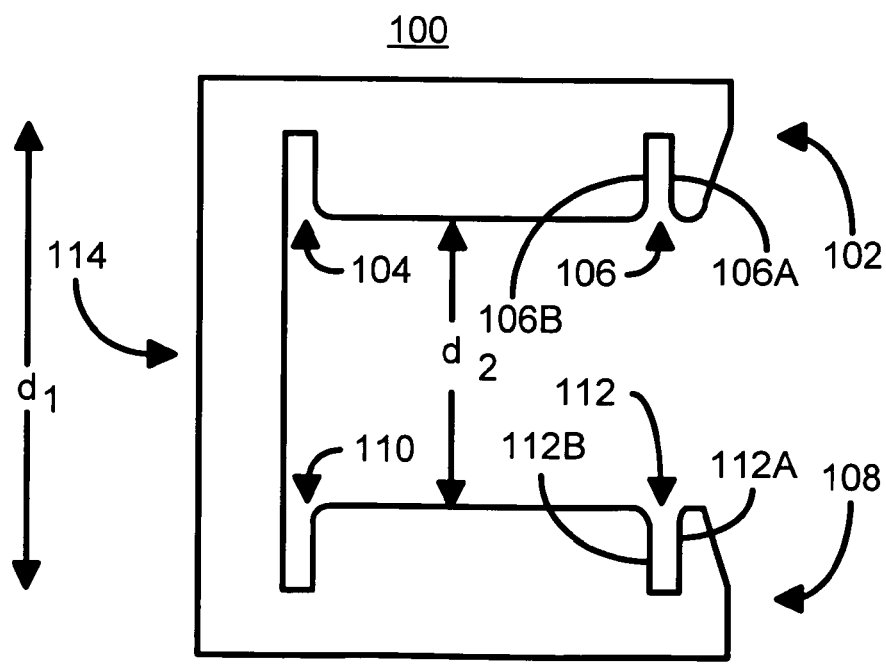
FIG. 4 depicts a side view of the clip formed in accordance with an exemplary embodiment of the present invention for mounting the flex cable in a head stack assembly.
Figure 5:
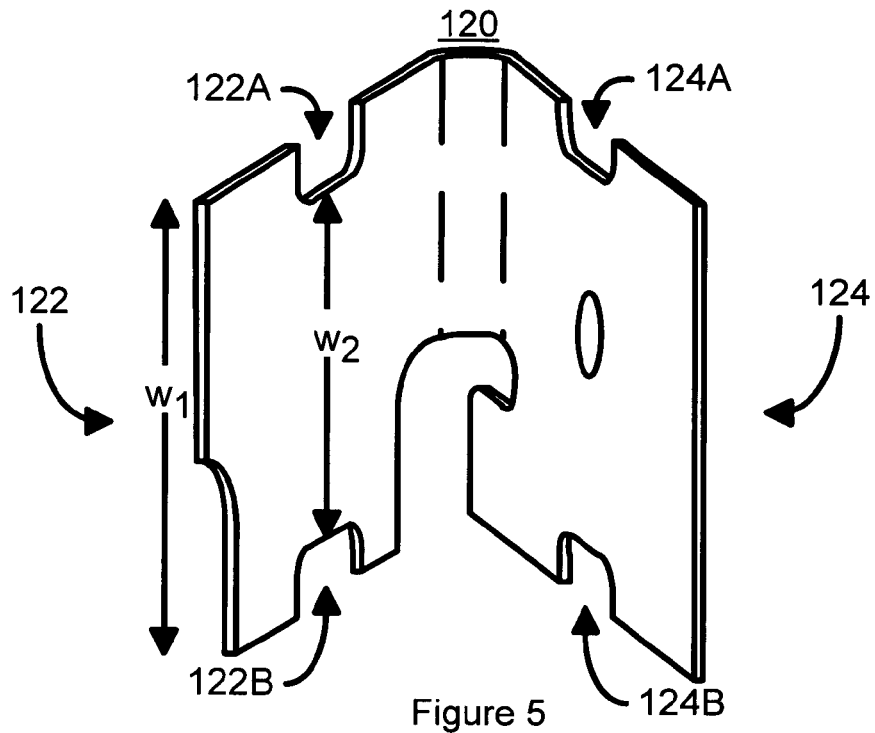
FIG. 5 depicts a portion of the flex cable in accordance with one exemplary embodiment of the present invention.

FIG. 3 depicts a clip 100 formed in accordance with an exemplary embodiment of the present invention. FIG. 4 depicts a side view of the clip 100 formed in accordance with an exemplary embodiment of the present invention. FIG. 5 depicts a portion of the flex cable 120 in accordance with one exemplary embodiment of the present invention. The flex cable 120 includes portions 122 and 124.

Referring to FIGS. 3-5, the clip 100 includes a top portion 102 and a bottom portion 108 that may be coupled using member 114. The member 114 is at one end of the portions 102 and 108. Thus, the clip 100 shown is substantially C-shaped. In a preferred embodiment, the clip 100 is integrally formed from a single piece of Ultem plastic.

The top portion 102 includes slots 104 and 106 therein. Similarly, the bottom portion 108 includes slots 110 and 112 that are substantially aligned with the slots 104 and 106, respectively. The slots 106 and 104 are at an angle, φ, with respect to each other. The angle φ is an acute, nonzero angle. In one embodiment, φ is at least five degrees and not more than thirty degrees. In a preferred embodiment, φ is at least seven degrees and not more than seventeen degrees. The slots 104 and 106 are thus not parallel. Similarly, the slots 112 and 110 are at an angle, φ, with respect to each other and are, therefore, not parallel. The slots 106 and 112 retain a portion 124 of the flex cable 120, while the slots 104 and 114 retain another portion 122 of the flex cable 120. The clip 100, and thus the portion 124 of the flex cable 120, is preferably mounted to a metal stiffener (not shown) affixed to the actuator body (not shown) using the slots 106 and 112.

The slots 106 and 112 and the slots 104 and 110 are used to retain the portions 124 and 122, respectively, of the cable 120. The slots 106 and 112 have outside edges 106A and 112A, respectively, and inside edges 106B and 112B, respectively. In one embodiment, the outside edges 106A and 112A abut a mounting surface while the inside edges 106B and 112B retain the portion 124 of the flex cable 120. The slots 106 and 112 or the slots 104 and 110 are preferably configured such that the maximum distance, $d_1$, between the slots 104 and 110 or the slots 106 and 112 is at least the width of the flex cable 120. Similarly, the slots 106 and 112 or the slots 104 and 110 are preferably configured such that the maximum distance, $d_2$, between the slots 104 and 110 or the slots 106 and 112 is less than the width of the flex cable 120 in the region of the flex cable 120 in which the clip 100 is used. In a preferred embodiment, the flex cable 120 includes notches 122A, 122B, 124A, and 124B in the region in which the clip 100 is used. The width of the flex cable 120 is $w_1$ away from the notches, while the width of the flex cable 120 between the notches 122A and 122B and the notches 124A and 124B is $w_2$. Thus, $d_1$ is preferably larger than $w_1$, while $d_2$ is preferably less than $w_2$. Consequently, the slots 106 and 112 and the slots 104 and 110 retain the portions 124 and 122, respectively, of the cable 120.

Figure 6:
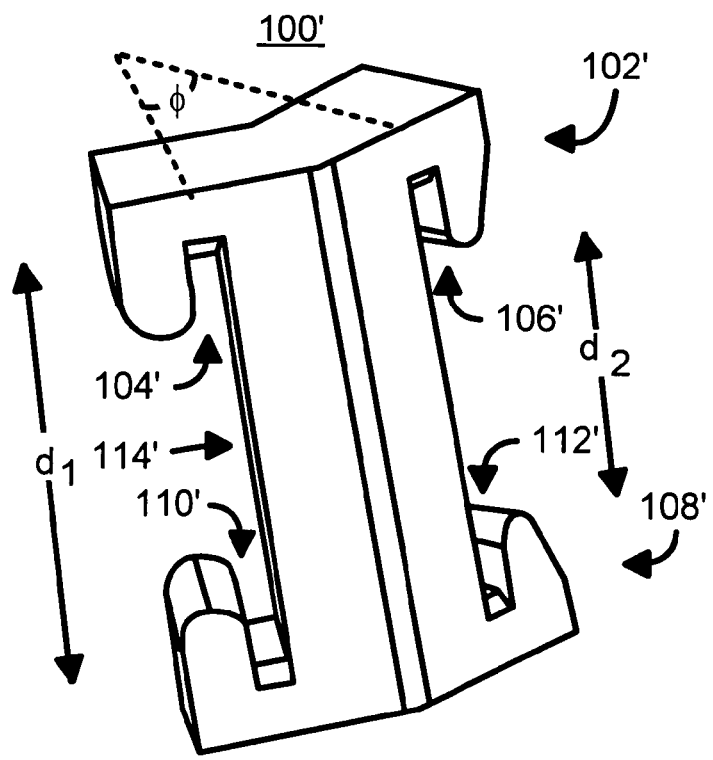
FIG. 6 depicts a clip formed in accordance with another exemplary embodiment of the present invention for mounting a flex cable in a head stack assembly.

FIG. 6 depicts a clip 100' formed in accordance with another exemplary embodiment of the present invention. Portions of the clip 100' are analogous to the clip 100 and are, therefore, labeled similarly. Consequently, the clip 100' includes a top portion 102', a bottom portion 108', and a member 114'. The top portion 102' includes slots 104' and 106' therein. Similarly, the bottom portion 108' includes slots 110' and 112' that are substantially aligned with the slots 104' and 106', respectively. The slots 106' and 104' are at an angle, φ', with respect to each other. The angle φ' is analogous to the angle φ. Consequently, the angle φ' is acute and nonzero. In one embodiment, φ' is at least five degrees and not more than thirty degrees. In a preferred embodiment, φ' is at least seven degrees and not more than seventeen degrees. Moreover, the slots 104' and 110' and the slots 106' and 112' are preferably configured with the same distances as in the clip 100. The 114' joins the central portions of the top and bottom portions 102' and 110'. Thus, the clip 100' shown is substantially I-shaped. In a preferred embodiment, the clip 100 is integrally formed from a single piece of Ultem plastic.

Figure 7:
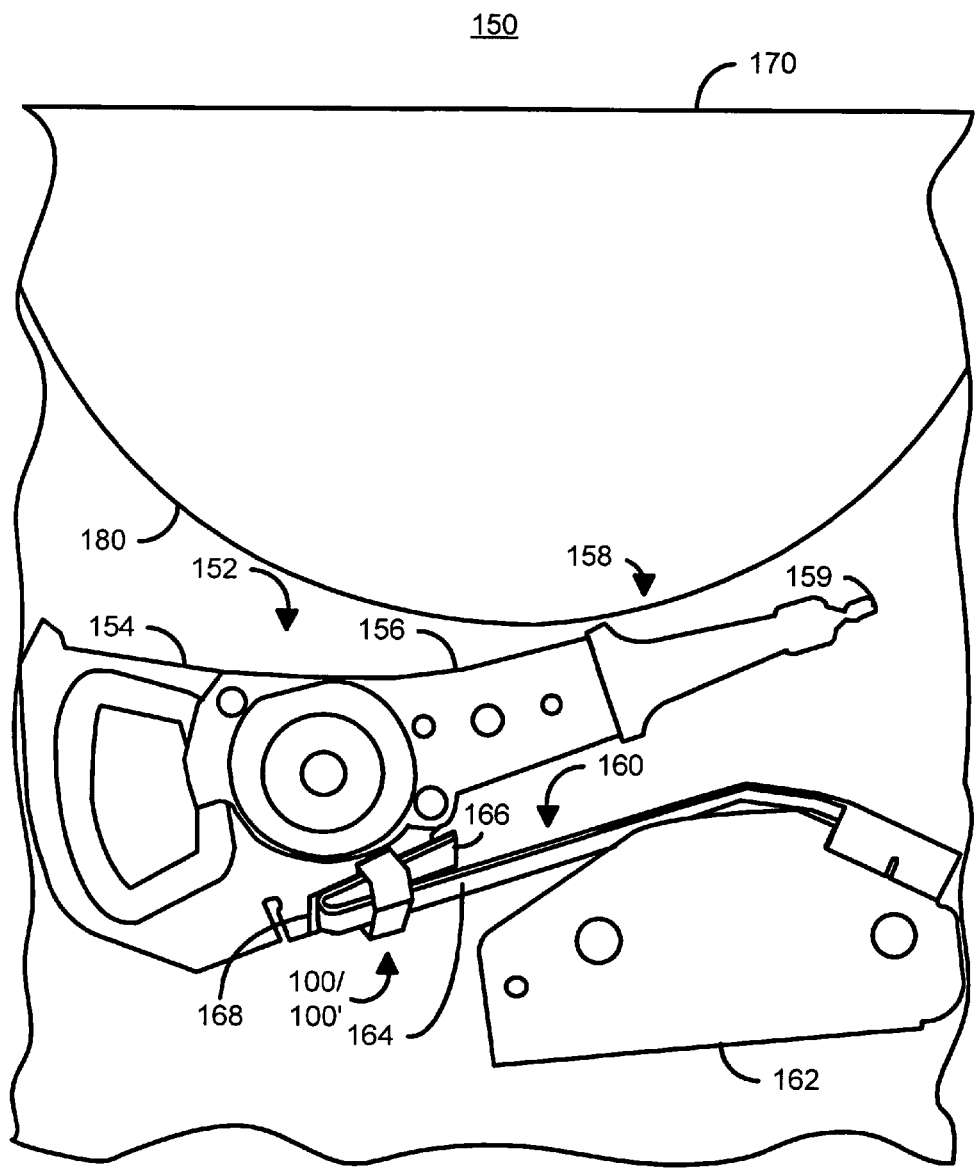
FIG. 7 depicts a portion of the head stack assembly using the clip in accordance with an exemplary embodiment of the present invention.
Figure 8:
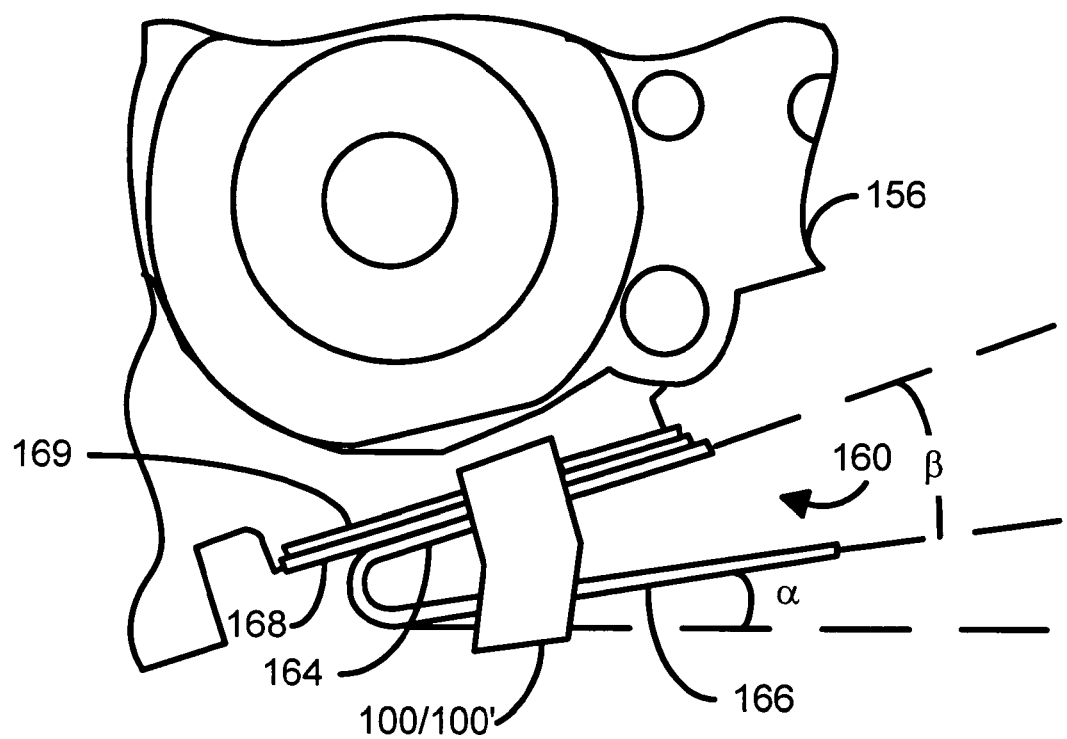
FIG. 8 depicts a portion of the head stack assembly used in mounting the clip to an actuator body in accordance with an exemplary embodiment of the present invention.

FIG. 7 depicts a portion of the head stack assembly (HSA) 150 using the clip 100 or 100' in accordance with an exemplary embodiment of the present invention. FIG. 8 depicts a smaller portion of the HSA 150 used in mounting the clip to an actuator body in accordance with an exemplary embodiment of the present invention. Referring to FIGS. 7-8, the HSA 150 includes an actuator assembly 152, a head gimbal assembly (HGA) 158 including head(s) 159, flex circuit 160, circuitry 162, and mounting structure 168. Also depicted are disk(s) 180 and base 170. The actuator assembly 152 includes an actuator body 154 and an actuator arm 156. In a preferred embodiment, the mounting structure 168 is a metal stiffener affixed to the actuator body 154 with adhesive 169. The flex cable 160 includes a first portion 164 and a second portion 166. The portions 164 and 166 of the flex cable 160 are analogous to the portions 122 and 124 described above with respect to FIG. 5.

Referring back to FIGS. 3 and 5-8, the clip 100/100' is configured such that the portions 164 and 166 of the flex cable 160 make an angle, β, that is acute but non-zero. In one embodiment, β is at least five degrees and not more than thirty degrees. In a preferred embodiment, β is at least seven degrees and not more than seventeen degrees. As a result, the exit angle, α, is decreased. In one embodiment, the exit angle, α, is at or near zero degrees.

Thus, using the clip 100 or 100', the flex cable 160 is mounted in the HSA 152. Because the clip 100 and 100' retain the portions 164 and 166 of the flex cable 160 at an angle that acute but non-zero, the exit angle, α, is reduced. As a result, there may be a reduced possibility that the flex cable 160 will interfere with the disk(s) 180 when the head(s) 159 are at the inside diameter of the disk(s) 180. Similarly, there may be a reduced possibility that the flex cable 160 will interfere with the actuator assembly 150 when the head(s) 159 are at the outside diameter of the disk(s) 180. Performance of the disk drive may thereby be improved. Furthermore, because of the size of the exit angle, α, a smaller driving torque from the servo control system may be required to position the head(s) 159 at the inside diameter of the disk(s). A voice coil motor (not shown) within the servo control system may, therefore, provide a smaller driving torque. Consequently, the HSA 152 may be easier to position near the inside diameter of the disk(s). Thus, performance of the disk drive may be improved.

We claim:

1. A head stack assembly comprising:
   a flex cable having a width;
   an actuator body; and
   a clip for mounting the flex cable to the actuator body, the clip including a top portion and a bottom portion coupled to the top portion by a member, the top portion including a first top slot and a second top slot therein, the first top slot and the second top slot forming a non-zero acute angle, the bottom portion including a first bottom slot and a second bottom slot therein, the first bottom slot being substantially aligned with the first top slot to face and oppose the first top slot, the second bottom slot being substantially aligned with the second top slot to face and oppose the second top slot, a first maximum distance between the first top slot and the first bottom slot equaling or exceeding the width; a second maximum distance between the second top slot and the second bottom slot equaling or exceeding the width;
   wherein the first and second top slots and the first and second bottom slots retain the flex cable, and wherein the top portion and the bottom portion are a single monolithic piece rather than an assembly of sub-components; and
   wherein the member resides between the first top slot and the second top slot and between the first bottom slot and the second bottom slot.

2. The head stack assembly of claim 1 wherein the angle is at least five degrees and not more than thirty degrees.

3. The head stack assembly of claim 2 wherein the angle is at least seven degrees and not more than seventeen degrees.

4. The head stack assembly of claim 1 wherein the clip is plastic.

5. The head stack assembly of claim 1 further comprising:
a metal stiffener fixed to the actuator body, the clip removably attached to the metal stiffener.

6. The head stack assembly of claim 1 wherein the clip forms a substantially I-shaped structure.

7. The head stack assembly of claim 1 wherein the clip has a height of two millimeters more than the width.

8. The head stack assembly of claim 1 wherein the first maximum distance is 0.025 mm more than the width.

9. The head stack assembly of claim 1 wherein the second maximum distance is 0.025 mm more than the width.

10. A disk drive comprising:
a base;
at least one disk coupled with the base; and
a head stack assembly coupled with the base, the head stack assembly including an actuator body having a mounting surface, a flex cable and a clip for attaching the flex cable to the mounting surface, the clip further including a top portion and a bottom portion coupled to the top portion by a member, the top portion including a first top slot and a second top slot therein, the first top slot and the second top slot forming a non-zero acute angle, the bottom portion including a first bottom slot and a second bottom slot therein, the first bottom slot being substantially aligned with the first top slot to face and oppose the first top slot, the second bottom slot being substantially aligned with the second top slot to face and oppose the second top slot, a first maximum distance between the first top slot and the first bottom slot equaling or exceeding the width; a second maximum distance between the second top slot and the second bottom slot equaling or exceeding the width;
wherein the first and second top slots and the first and second bottom slots are in contact with the flex cable, and wherein the top portion and the bottom portion are a single monolithic piece rather than an assembly of sub-components; and
wherein the member resides between the first top slot and the second top slot and between the first bottom slot and the second bottom slot.

11. The disk drive of claim 10 wherein the angle is at least five degrees and not more than thirty degrees.

12. The disk drive of claim 11 wherein the acute angle is at least seven degrees and not more than seventeen degrees.

13. The disk drive of claim 10 wherein the clip is plastic.

14. The disk drive of claim 10 wherein the mounting surface further includes a metal stiffener.

15. The disk drive of claim 10 wherein the clip has a height of two millimeters more than the width.

16. The disk drive of claim 10 wherein the first maximum distance is 0.025 mm more than the width.

17. The disk drive of claim 10 wherein the second maximum distance is 0.025 mm more than the width.

18. The disk drive of claim 10 wherein the clip forms a substantially I-shaped structure.

* * * * *